United States Patent [19]
Gerber et al.

[11] Patent Number: 5,888,590
[45] Date of Patent: *Mar. 30, 1999

[54] APPARATUS AND METHOD FOR CONFORMALLY COATING A CAPACITOR

[75] Inventors: George V. Gerber, Bonita, Calif.; Felix Zandman, Bala Cynwyd, Pa.

[73] Assignee: Vishay Sprague, Inc., Sanford, Me.

[*] Notice: This patent issued on a continued prosecution application filed under 37 CFR 1.53(d), and is subject to the twenty year patent term provisions of 35 U.S.C. 154(a)(2).

[21] Appl. No.: 710,364

[22] Filed: Sep. 16, 1996

[51] Int. Cl.$^6$ .............................. B05D 1/22; B05D 1/32; B05D 3/02

[52] U.S. Cl. ......................... 427/459; 427/79; 427/185; 427/300; 427/459; 29/25.03

[58] Field of Search .............................. 427/79, 185, 282, 427/300, 459, 468; 29/25.03; 118/504, DIG. 5

[56] References Cited

U.S. PATENT DOCUMENTS

| | | | |
|---|---|---|---|
| 3,377,183 | 4/1968 | Hurt, Jr. et al. | 427/475 |
| 3,440,078 | 4/1969 | Sharetts | 427/185 |
| 3,618,929 | 11/1971 | Upchurch | 269/6 |
| 4,203,194 | 5/1980 | McGrath | 29/25.03 |
| 4,517,219 | 5/1985 | Hajek | 427/8 |
| 4,885,187 | 12/1989 | Koenig | 427/58 |

*Primary Examiner*—Shrive Beck
*Assistant Examiner*—Fred J. Parker
*Attorney, Agent, or Firm*—Zarley, McKee, Thomte, Voorhees & Sease

[57] ABSTRACT

A method of conformally coating a capacitor with an epoxy layer of the present invention is used to coat the capacitor using fluidized bed techniques. The method includes the use of a chiller bar which is placed against the cathode surface of a capacitor slug which has been heated to 150° C. The capacitor slug and chiller bar are then dipped into the fluidized bed of epoxy powder. The epoxy powder will melt to the capacitor slug on all surfaces except the surface in contact with the chiller bar. After removing the capacitor slug and chiller bar from the fluidized bed and separating the chiller bar from the capacitor, the capacitor will be coated with a layer of epoxy coating on all surfaces except the cathode surface.

4 Claims, 3 Drawing Sheets

APPARATUS AND METHOD FOR CONFORMALLY COATING A CAPACITOR

BACKGROUND OF THE INVENTION

1. Field of the Invention

The present invention relates to conformally coated capacitors. More particularly, though not exclusively, the present invention relates to an apparatus and method for conformally coating a capacitor using a fluidized bed.

2. Problems in the Art

Capacitors exist in the art which are made from a tantalum slug or pellet. To create a conventional tantalum slug, tantalum powder is pressed and then exposed to a process for forming a polarized capacitor. A typical tantalum slug will have an anode comprised of a wire extending from the slug and a conductive surface for the cathode.

It is desirable to coat the tantalum slugs to create conformally coated capacitors. Conformally coated capacitors are desirable because of their high volumetric efficiency (capacitance per volume). If a very thin conformal coating is placed on a tantalum slug, a volumetric efficiency is achieved which is higher than efficiencies from tantalum capacitors where the anode is protected by molding.

The traditional method of applying a conformal coating of insulating epoxy to capacitors has been by electrostatically charged epoxy powder deposition. Electrostatic coating provides the best total coverage in a thin single pass deposition. However, electrostatic coating requires a powder formulation that is favorable to this process and not necessarily to the end product. Electrostatic coating is a process that requires passage of the capacitors one at a time past the charged powder and subsequent removal of the unwanted powder by wiping powder from the cathode face at the conclusion of the powder application. This is required since it is necessary to keep the cathode end of the capacitor clean so that electrical contact can be made with the cathode.

Another prior art method of conformally coating components is by applying epoxy powder by fluidized bed coating. This method involves heating the component to be coated to a temperature above the melting point of the epoxy powder and submerging the heated components into a cloud of epoxy powder. Components coated using the fluidized bed method have traditionally required a coating over the entire surface of the component. Since the cathode end of the tantalum slug would be coated by the epoxy powder using the fluidized bed process, this process will not work for coating the tantalum slugs unless one part of the epoxy is removed to provide contact; this requires additional labor.

Therefore a need can be seen for efficiently and effectively conformally coating tantalum slugs without also coating the cathode end of the slug.

FEATURES OF THE INVENTION

A general feature of the present invention is the provision of a an apparatus and method for conformally coating capacitors which overcomes problems found in the prior art.

A further feature of the present invention is the provision of an apparatus and method for conformally coating capacitors using a fluidized bed and a cooling system for preventing the epoxy powder from coating the cathode surface of the capacitor.

Further features, objects and advantages of the present invention include:

An apparatus and method for conformally coating capacitors which results in capacitors having a high volumetric efficiency.

An apparatus and method for conformally coating capacitors which results in a manufacturing throughput that is much higher than traditional methods.

An apparatus and method for conformally coating capacitors which coats the capacitors at a lower cost than the prior art.

An apparatus and method for conformally coating capacitors which results in a coating that has a better moisture barrier than prior art capacitors An apparatus and method for conformally coating capacitors which results in a coating that is smoother than prior art coatings for facilitating pick and place equipment.

SUMMARY OF THE INVENTION

The method of conformally coating capacitor slugs of the present invention is used to coat a capacitor with a layer of melted epoxy powder using fluidized bed techniques. The components to be coated are heated to a temperature sufficient to melt the epoxy powder. A chiller bar is then placed into contact with a portion of the component and the assembly of the chiller bar and component are dipped into the fluidized bed of epoxy powder. The component and chiller bar are then removed from the bed and the chiller bar is separated from the component. The surface of the component which was in contact with the chiller bar will not have a coating of epoxy powder.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

Figure 1:
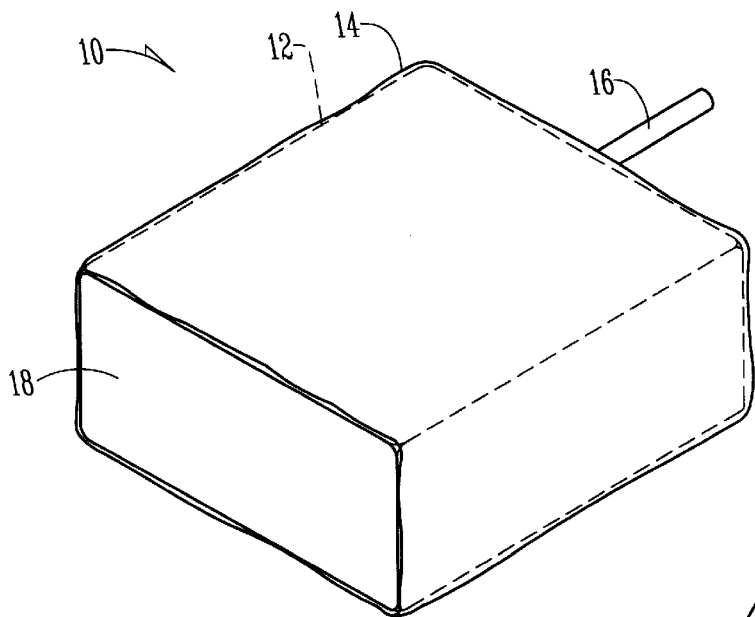
FIG. 1 is a perspective view of a capacitor according to the present invention.

FIG. 1 shows a capacitor 10 which has been conformally coated using the method of the present invention. The capacitor 10 is comprised of a tantalum slug 12 which has been conformally coated by an epoxy coating 14. The capacitor 10 has a wire 16 embedded at one end which serves as an anode. On the opposite end the capacitor 10 has a surface 18 which serves as a cathode of the capacitor 10. As shown, the cathode surface 18 is not coated with the epoxy coating 14.

FIGS. 2–6 illustrate the process for coating the tantalum slugs 12 with the epoxy coating 14. FIGS. 2–6 show a portion of a machine adapted to utilize the present invention. Although three tantalum slugs 12 are shown in the Figures, the capacitors 10 could be coated one at a time or in multiples as shown in the Figures.

Figure 2:
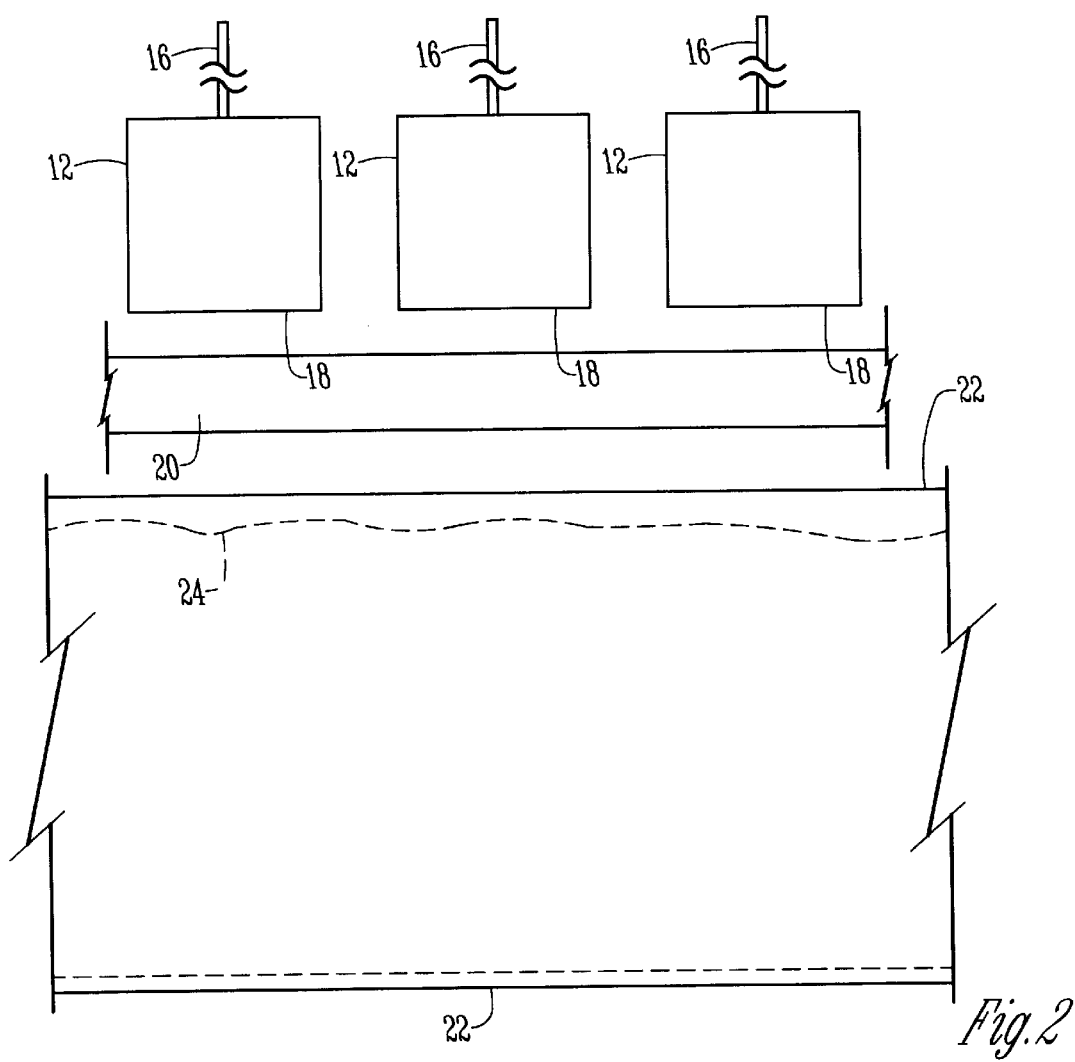
FIGS. 2–6 are views illustrating the process of conformally coating capacitors of the present invention.

FIG. 2 shows three tantalum slugs 12, each suspended by the wires 16 by a carrier rack (not shown). The tantalum slugs 12 are held in place with the cathode surface 18 facing downward. It is desired to coat the tantalum slug 12 on all of its surfaces except the cathode surface 18. Positioned below the tantalum slugs 12 is a chiller bar 20. The chiller bar 20 is adapted to be placed against the cathode surface 18 of each tantalum slug 12. Positioned beneath the chiller bar 20 is a fluidized bed 22. The fluidized bed 22 is filled with solid epoxy powder 24. The epoxy powder 24 is a very fine powder that is fluffed up by air.

Figure 3:
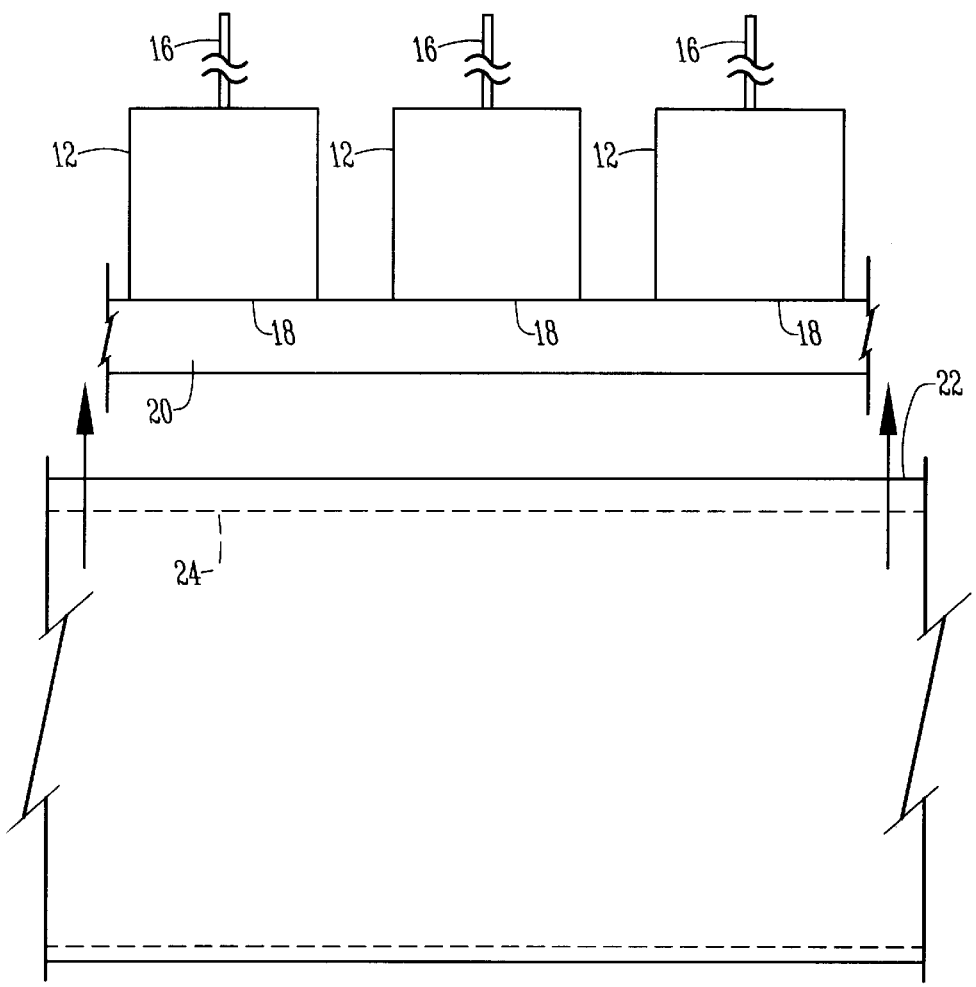

In order for the epoxy powder 24 to melt to the surface of the tantalum slugs 13, the slugs 12 must be heated. At the beginning of the process of the present invention, the tantalum slugs 12 are heated to a temperature of approximately 150° C. The chiller bar 20 is kept at room temperature which is substantially less than the temperature of the heated tantalum slugs 12 and is also well below the melting point of the epoxy powder 24. As shown in FIG. 3, the chiller bar 20 is raised up to the cathode surfaces 18 of the heated tantalum slugs 12. The level of the epoxy powder 24 within the fluidized bed 22 is leveled off by a blade (not shown) so that the depth of the fluidized powder 24 is uniform throughout the fluidized bed 22.

Figure 4:
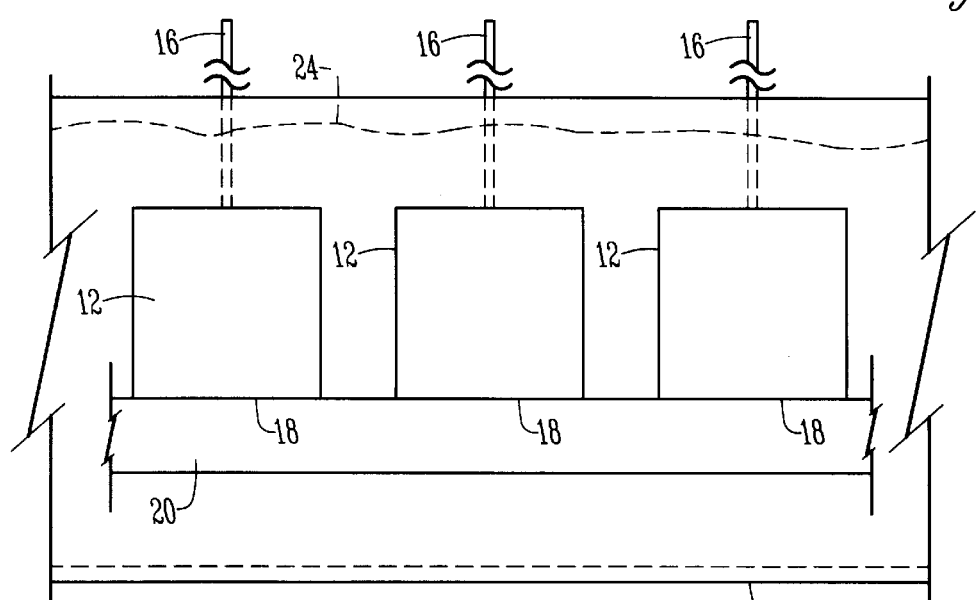
Figure 5:
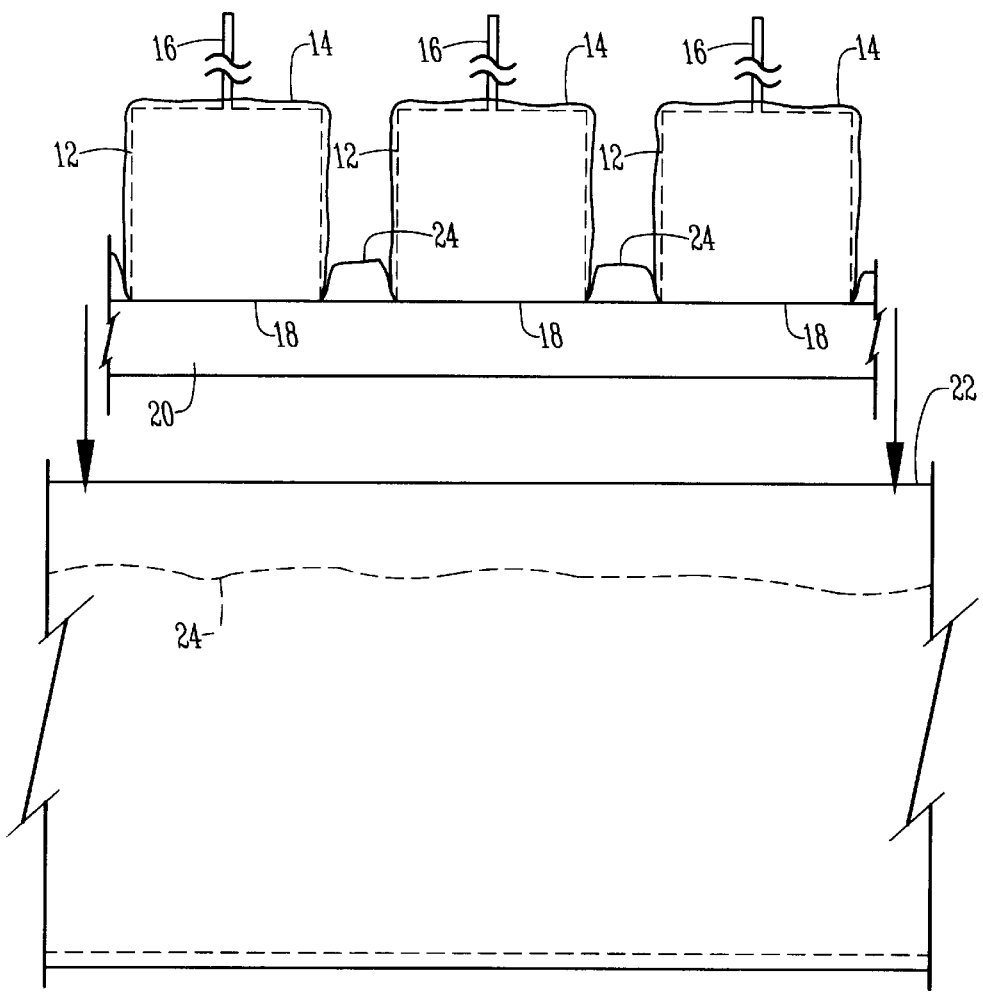
Figure 6:
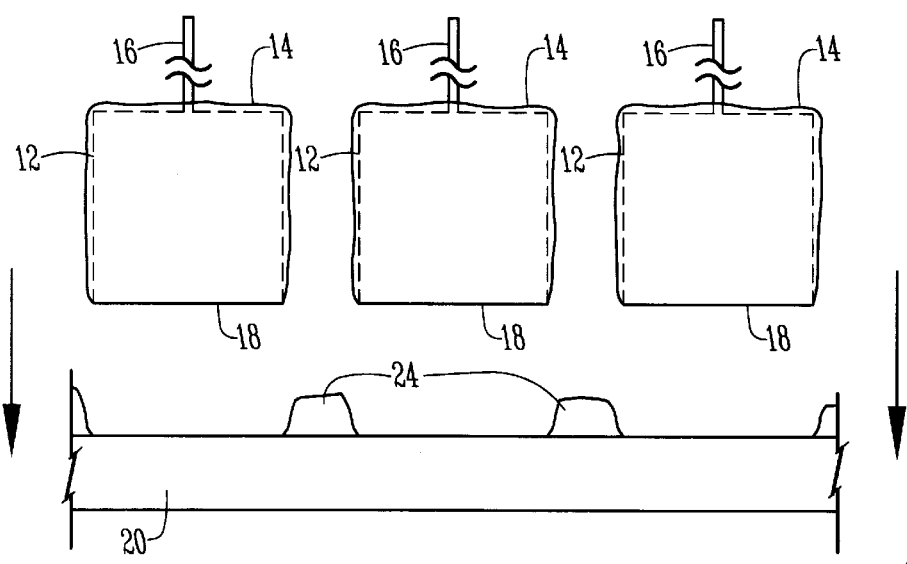

As shown in FIG. 4, the fluidized bed 22 is then raised so that the tantalum slugs 12 and the chiller bar 22 are all submerged in the powder 24 in the fluidized bed 22. The tantalum slugs 12 have five hot surfaces and one cold surface (surface 18). The fluidized bed 22 is then lowered, removing the tantalum slugs 12 and the chiller bar 20 from the epoxy powder 24 as shown in FIG. 5. As shown in FIG. 5, the tantalum slugs 12 are coated with a layer of epoxy coating 14 on all of their surfaces except the cathode surface 18 which is positioned against the chiller bar 20. An amount of epoxy powder 24 is also disposed on the chiller bar 20 between the tantalum slugs 12, although the powder 24 is still in a powder, non-melted form. Finally, as shown in FIG. 6, the chiller bar 20 is lowered away from the capacitors 10. As shown, the tantalum slugs 12 are coated on all of their sides except the cathode surfaces 18. The steps shown in FIGS. 2–6 may be repeated as many times as necessary to obtain the desired thickness of the coating 14. After the chiller bar 20 is lowered from the tantalum slugs 12 as shown in FIG. 6, the chiller bar 20 is cleaned with an air knife and vacuum collection system (not shown). Since the powder 24 disposed on the chiller bar 20 is still in the powder form, this is easily accomplished. The steps shown in the Figures can be repeated a number of times until a desired thickness of epoxy coating is reached.

After the capacitors 10 are coated with the epoxy coating 14, they are cured in an oven in a conventional fashion.

After the capacitors 10 have undergone the method of the present invention, the capacitors 10 may be processed in a conventional fashion. For example, the cathode surface 18 of each capacitor 10 may be painted or dipped with a conductive epoxy silver to create a cathode terminal. Similarly, the wire 16 may be cut and the anode end of the capacitor 10 may also be painted or dipped with a conductive epoxy silver to create an anode terminal.

While the method described above is the preferred method, many alternatives fall within the spirit and scope of the invention. For example, the chiller bar 20 could be heated along with the tantalum slugs 12 although the epoxy powder 24 would then melt to the chiller bar 20, preventing the chiller bar from being used more than once. It is therefore preferred that the chiller bar 20 is kept at a temperature below the melting point of the epoxy powder 24. While the preferred embodiment of the invention uses tantalum slugs, other types of slugs and other types of components may also be used with the present invention.

Alternatively, the method of the present invention could be used to prevent the coating of more than one surface of the tantalum slug 12 simply by designing the chiller bar to cover more than one surface, or to use more than one chiller bar. Also, the shape of the portion of the chiller bar 20 that comes into contact with the tantalum slug 12 can be altered to control the area of the slug 12 that is coated. The chiller bar can be any surface which comes in contacts with the component. The epoxy powder used with the present invention could take many forms, but the preferred powder is Dexter DK 05 powder.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method of conformally coating a capacitor pellet having a cathode surface and a remaining surface using fluidized bed techniques comprising the steps of:

providing a bed of fluidized epoxy powder, said epoxy powder having a melting point;

heating said capacitor pellet to a pellet temperature which is sufficiently above said melting point of said epoxy powder to cause said epoxy powder to melt upon contact with said capacitor pellet;

maintaining an elongated chiller bar at a chiller bar temperature below said melting point of said epoxy powder;

placing said chiller bar in contact with said cathode surface of said pellet to cool said cathode surface below said melting point of said epoxy powder while at the same time permitting said remaining surface to remain at said pellet temperature above said melting point of said epoxy powder;

immersing said capacitor pellet and said chiller bar into said bed of fluidized epoxy powder wherein said epoxy powder contacts said remaining surface of said capacitor pellet and melts to form a melted epoxy coating thereon, but does not melt upon contact with said chiller bar or said cooled cathode surface of said capacitor pellet;

removing said pellet and said chiller bar from said bed of fluidized epoxy powder after said immersing step;

separating said chiller bar from said cathode surface of said capacitor pellet after said removing step whereby said cathode surface of said capacitor pellet is free from use of coating of said melted epoxy powder and said remaining surface is coated with said melted epoxy powder.

2. A method according to claim 1 and further comprising suspending a plurality of said capacitor pellets in a suspended position with said cathode surfaces of said plurality of capacitor pellets facing in the same direction, and placing said chiller bar in contact with all of said cathode surfaces to cool said cathode surfaces below said melting point before said immersing step.

3. A method according to claim 1 and further comprising using an air knife to remove any unmelted epoxy powder from said chiller bar after said step of removing said pellet and said chiller bar from said fluidized bed.

4. A method according to claim 1 and further comprising heating said capacitor pellet to approximately 150° C. during said heating step and maintaining said chiller bar at approximately room temperature during said maintaining step.

* * * * *